United States Patent
Chow et al.

(10) Patent No.: US 8,583,405 B2
(45) Date of Patent: Nov. 12, 2013

(54) CONTINGENCY ANALYSIS INFORMATION FOR UTILITY SERVICE NETWORK

(76) Inventors: Maggie Chow, Hartsdale, NY (US); Mark Mastrocinque, East Northport, NY (US); Robert J. Blick, Bellerose, NY (US); Roger N. Anderson, New York, NY (US); Albert Boulanger, New York, NY (US); Philip Gross, Brooklyn, NY (US)

( * ) Notice: Subject to any disclaimer, the term of this patent is extended or adjusted under 35 U.S.C. 154(b) by 770 days.

(21) Appl. No.: 12/777,803

(22) Filed: May 11, 2010

(65) Prior Publication Data

US 2011/0282703 A1 Nov. 17, 2011

(51) Int. Cl.
*G06F 11/30* (2006.01)
*G21C 17/00* (2006.01)
*G06Q 10/00* (2012.01)

(52) U.S. Cl.
USPC .......... 702/182; 702/181; 702/183; 705/7.36; 705/7.37; 705/7.38

(58) Field of Classification Search
USPC ............... 700/17, 22, 83, 286, 192, 295, 297; 705/7.36–7.38; 713/300–340; 702/181–183
See application file for complete search history.

(56) References Cited

U.S. PATENT DOCUMENTS

| | | | |
|---|---|---|---|
| 5,764,155 A * | 6/1998 | Kertesz et al. | 700/295 |
| 5,862,391 A * | 1/1999 | Salas et al. | 713/300 |
| 6,055,517 A | 4/2000 | Friend et al. | |
| 6,125,044 A * | 9/2000 | Cherniski et al. | 361/799 |
| 6,219,650 B1 | 4/2001 | Friend et al. | |
| 6,581,045 B1 | 6/2003 | Watson | |
| 6,629,044 B1 * | 9/2003 | Papallo et al. | 702/60 |
| 7,236,953 B1 * | 6/2007 | Cooper et al. | 705/36 R |
| 7,243,081 B2 | 7/2007 | Friend et al. | |
| 7,555,454 B2 * | 6/2009 | Cooper et al. | 705/36 R |
| 7,925,557 B1 | 4/2011 | Ficery et al. | |
| 7,945,524 B2 * | 5/2011 | Anderson et al. | 706/12 |
| 8,116,915 B2 | 2/2012 | Kempton | |
| 8,305,737 B2 * | 11/2012 | Ewing et al. | 361/622 |
| 2003/0016004 A1 * | 1/2003 | Jungwirth et al. | 324/113 |
| 2003/0171851 A1 | 9/2003 | Brickfield et al. | |
| 2004/0034608 A1 * | 2/2004 | de Miranda et al. | 706/16 |
| 2005/0207081 A1 | 9/2005 | Ying | |
| 2006/0200400 A1 | 9/2006 | Hunter et al. | |
| 2007/0228843 A1 | 10/2007 | Radley | |
| 2008/0183339 A1 | 7/2008 | Vaswani et al. | |
| 2009/0063094 A1 | 3/2009 | Havener et al. | |

(Continued)

OTHER PUBLICATIONS

Dutta, et al., "Estimating the Time Between Failures of Electrical Feeders in the New York Power Grid", *Next Generation Data Mining Summit*, NGDIVI, 5 pages (2009).

(Continued)

*Primary Examiner* — Ramesh Patel
(74) *Attorney, Agent, or Firm* — Baker Botts, L.L.P.

(57) ABSTRACT

A system and computer-implemented method of providing contingency analysis information for a utility service network that includes obtaining contingency analysis information from a plurality of external sources, integrally combining the contingency analysis information obtained from each of the plurality of external sources into a single application and prioritizing the contingency analysis information in a predetermined order, dynamically updating, the contingency analysis information obtained from each of the plurality of external sources and the prioritization of the contingency analysis information based on status information, and displaying the contingency analysis information to a user via a graphical user interface.

36 Claims, 11 Drawing Sheets

(56) References Cited

U.S. PATENT DOCUMENTS

| | | | |
|---|---|---|---|
| 2009/0063122 A1* | 3/2009 | Nasle | 703/18 |
| 2009/0076749 A1* | 3/2009 | Nasle | 702/62 |
| 2009/0178089 A1 | 7/2009 | Picco et al. | |
| 2009/0187285 A1 | 7/2009 | Yaney et al. | |
| 2010/0106641 A1 | 4/2010 | Chassin et al. | |
| 2010/0107173 A1 | 4/2010 | Chassin | |
| 2010/0114387 A1 | 5/2010 | Chassin | |
| 2010/0169226 A1 | 7/2010 | Lymbery et al. | |
| 2010/0185557 A1 | 7/2010 | Hunter et al. | |
| 2010/0207728 A1 | 8/2010 | Roscoe et al. | |
| 2010/0306014 A1* | 12/2010 | Chow | 705/8 |
| 2010/0332373 A1 | 12/2010 | Crabtree et al. | |
| 2011/0172973 A1 | 7/2011 | Richards et al. | |
| 2012/0029677 A1 | 2/2012 | Havener et al. | |
| 2013/0080205 A1 | 3/2013 | Anderson et al. | |

OTHER PUBLICATIONS

Lundgren, "Implementing Service model Visualizations: Utilizing Hyperbolic Tree Structures for Visualizing Service Models in Telecommunication Networks", *Institutionen for Informatik*, 30 pages (2009).

Becker, et al., "Real-time Ranking with Concept Drift Using Expert Advice", *Proceedings of the 13th ACM SIGKDD International Conference on Knowledge Discovery and Data Mining*, ACM, pp. 86-94 (2007).

Radeva, et al., "Report Cards for Manholes: Eleciting Expert Feedback for a Learning Task", 2009 *International Conference on Machine Learning and Applications*, pp. 1-6 (2009).

Rudin et al. "Predicting vulnerability to serious manhole events in Manhattan: A preliminary machine learning approach", *Machine Learning Manuscript* No. 80.1; pp. 1-31 (2008).

Rudin, et al., "A process for predicting manhole events in Manhattan", *Machine Learning*, 80(1):1-31 (Jan. 28, 2010).

* cited by examiner

CONTINGENCY ANALYSIS INFORMATION FOR UTILITY SERVICE NETWORK

BACKGROUND

The present invention relates generally to utility services, and more specifically, to a method and contingency analysis information system for providing an automated and integrated way for analyzing a utility service network and addressing fault occurrences within the utility service network.

Utility service networks periodically experience fault occurrences such as feeder losses, feeder faults, overloads and outages. Typically, to address these fault occurrences, an operator(s) of the utility service network is required to gather information by navigating through several separate applications. Each application may require separate login information in order to access the respective application. Once logged in, the operator may have to further to navigate through various screens within the respective application to obtain the information needed for analyzing the contingency and respond.

For example, if there is a loss of a feeder, an operator accesses several different applications to determine which feeder is lost. If a fault occurs on a feeder, in order to determine where the fault has taken place, the operator accesses several different applications which show reactance to fault application, reports of manhole fires on the feeder, contractor damage, trouble structures having environmental problems, and requests for cleaning structures, for example. The operator also has to determine the nature of the feeder fault by accessing various applications, and attempt to predict the next worst feeder to lose by accessing several different applications. The operator further determines if there are any current distribution equipment overloads, any isolated or spot networks affected, and overhead systems affected such as stepdowns, multibank substation, and whether there are any existing customer outages and attempts to predict future outages. The process of analyzing the fault occurrences and responding to these occurrences can be very time-consuming.

While existing methods for analyzing utility service network faults are suitable for their intended purpose, improvements may be made in providing a method and contingency analysis system that provides an integrated application of the utility service network and system conditions.

SUMMARY

According to one embodiment of the present invention, a computer-implemented method of providing contingency analysis information for a utility service network is provided. The computer-implemented method includes obtaining contingency analysis information from a plurality of external sources, integrally combining the contingency analysis information obtained from each external source into a single application and prioritizing the contingency analysis information in a predetermined order, dynamically updating, the contingency analysis information obtained from each external source and the prioritization of the contingency analysis information based on status information, and displaying the contingency analysis information to a user via a graphical user interface.

A computer readable storage medium and system performing the method mentioned above are also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2 is a screenshot illustrating contingency analysis information of the system shown in FIG. 1 for a plurality of utility service networks that can be implemented within embodiments of the present invention.

FIG. 3 is a screenshot illustrating an example of contingency analysis information for a specified utility service network that can be implemented within embodiments of the present invention.

FIG. 5 is a screenshot illustrating additional detailed information regarding overloaded feeders that can be implemented within embodiments of the present invention.

FIG. 6 is a screenshot illustrating additional detailed feeder information that can be implemented within embodiments of the present invention.

Figure 7:
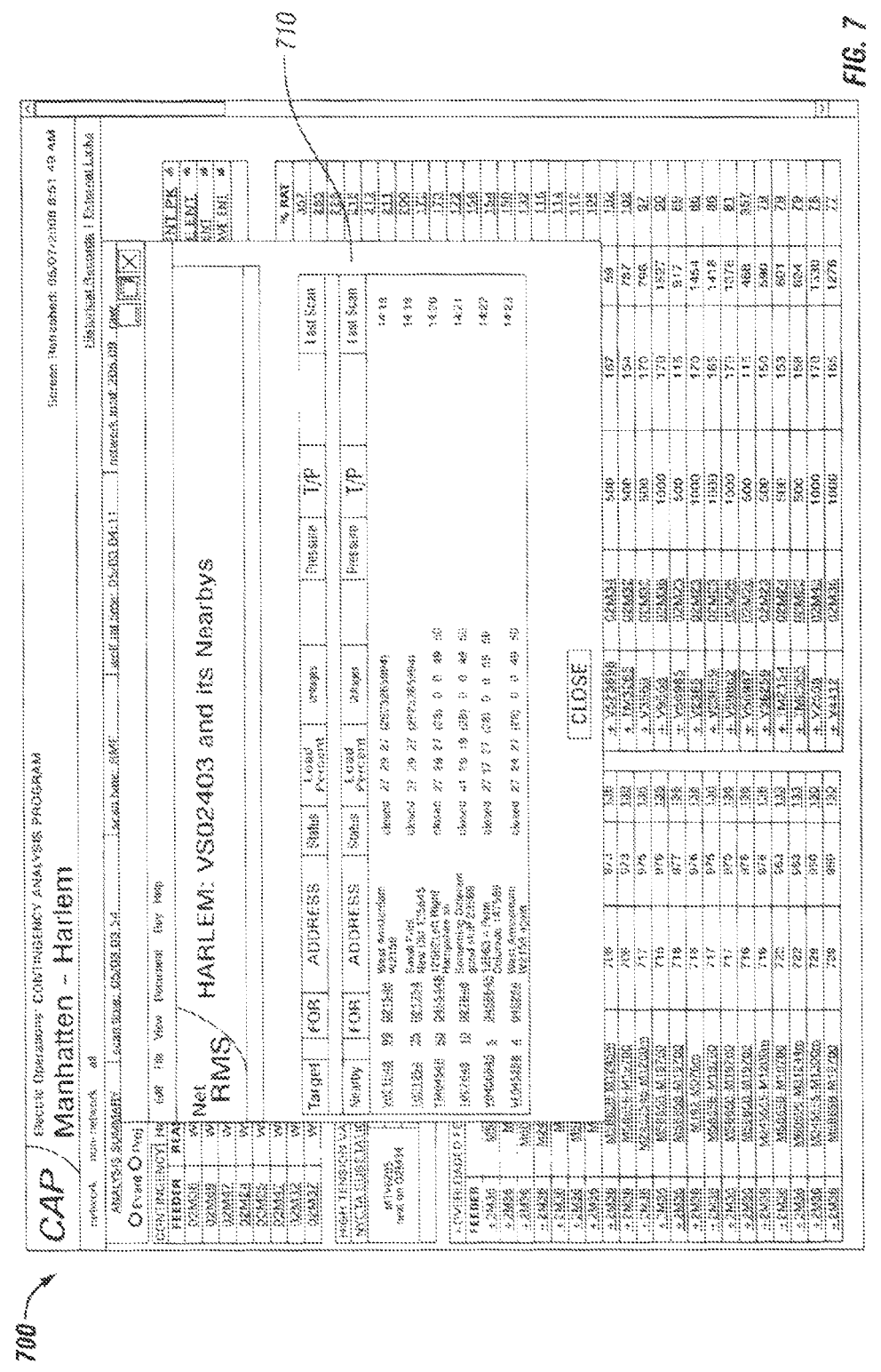
Figure 8:
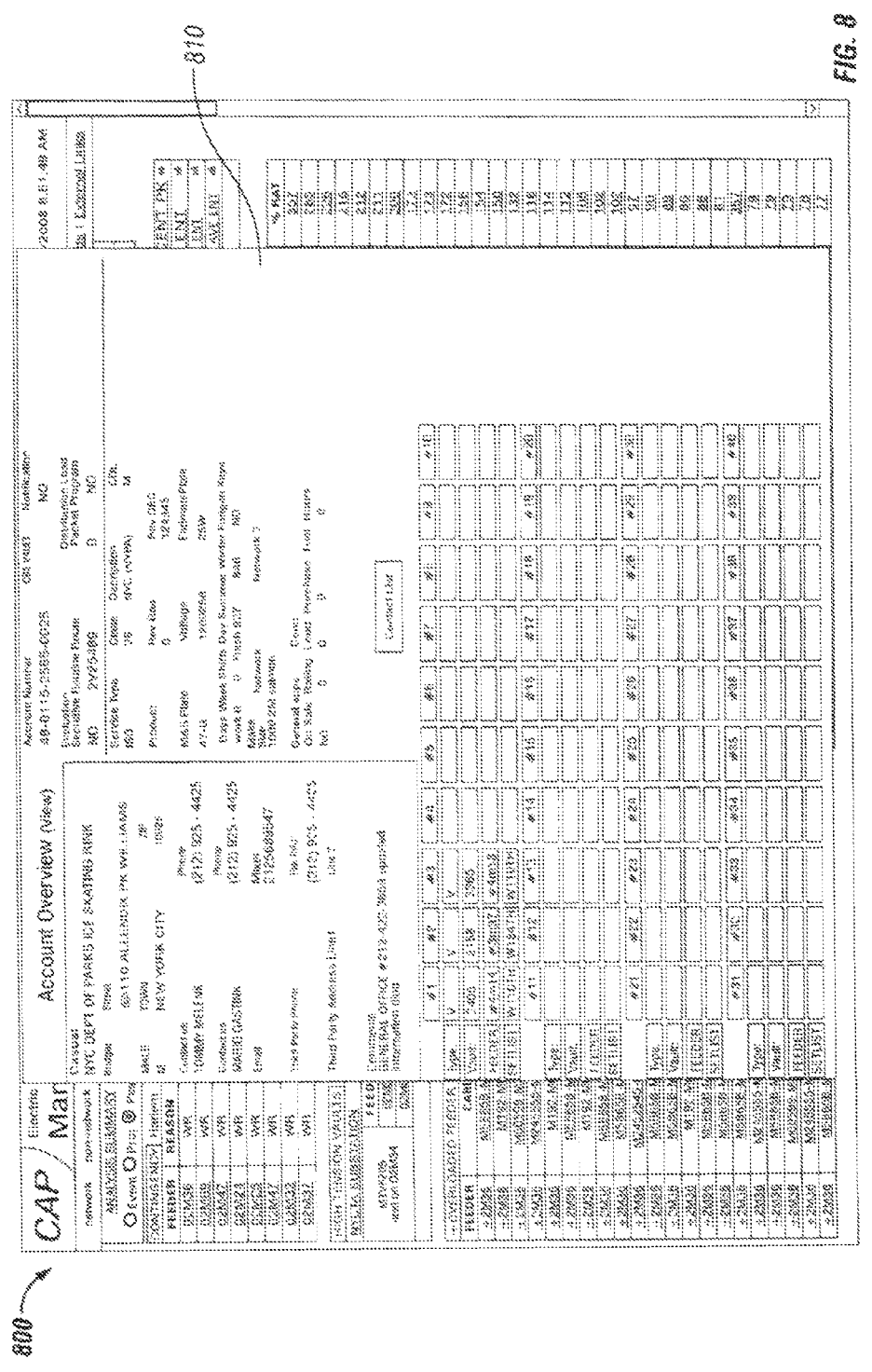
Figure 9:
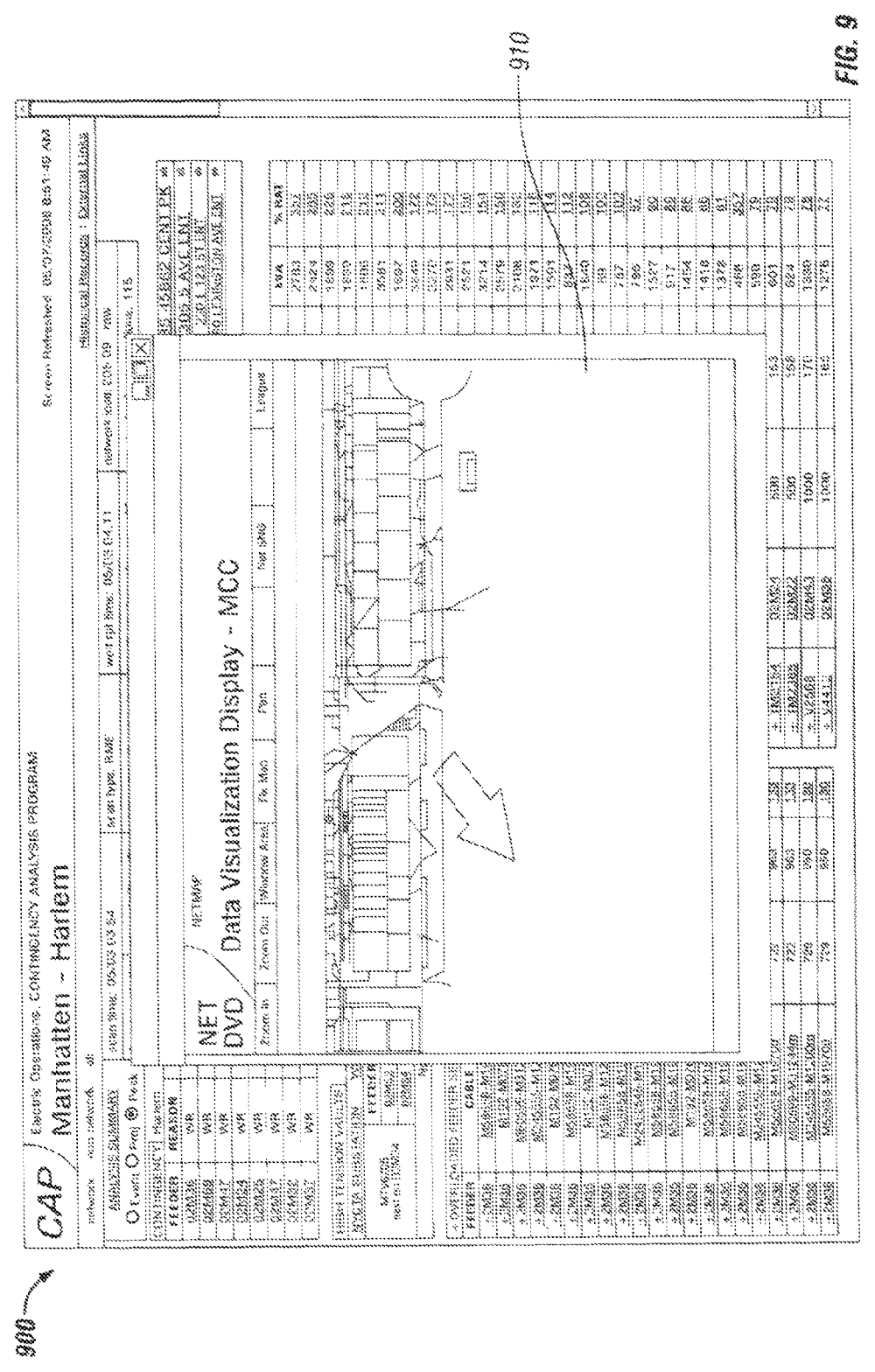
Figure 10:
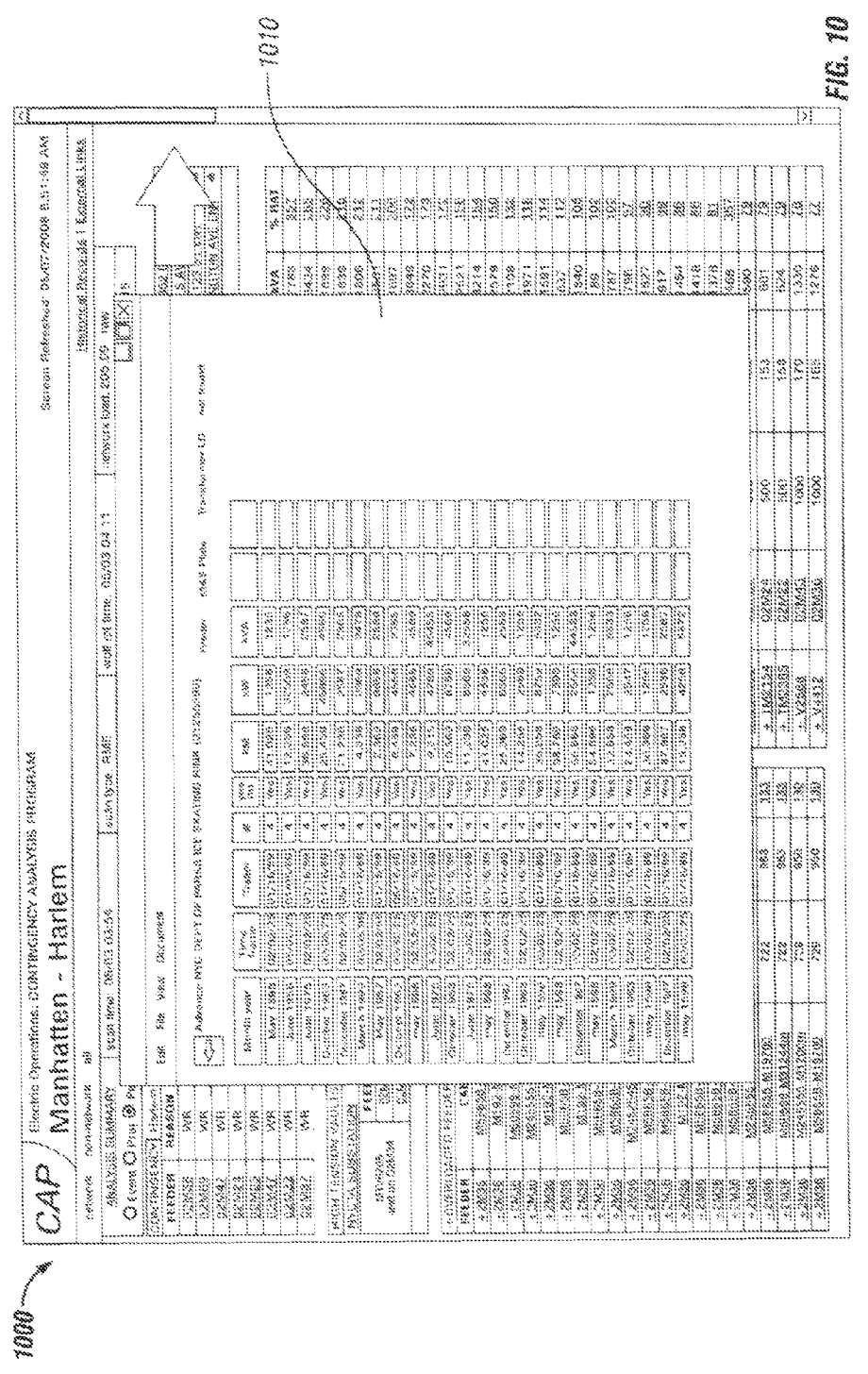

FIGS. 7 through 10 illustrates screenshots showing a plurality of displays accessible by a user via the graphical user interface shown in FIG. 1 that can be implemented within embodiments of the present invention.

Figure 11:
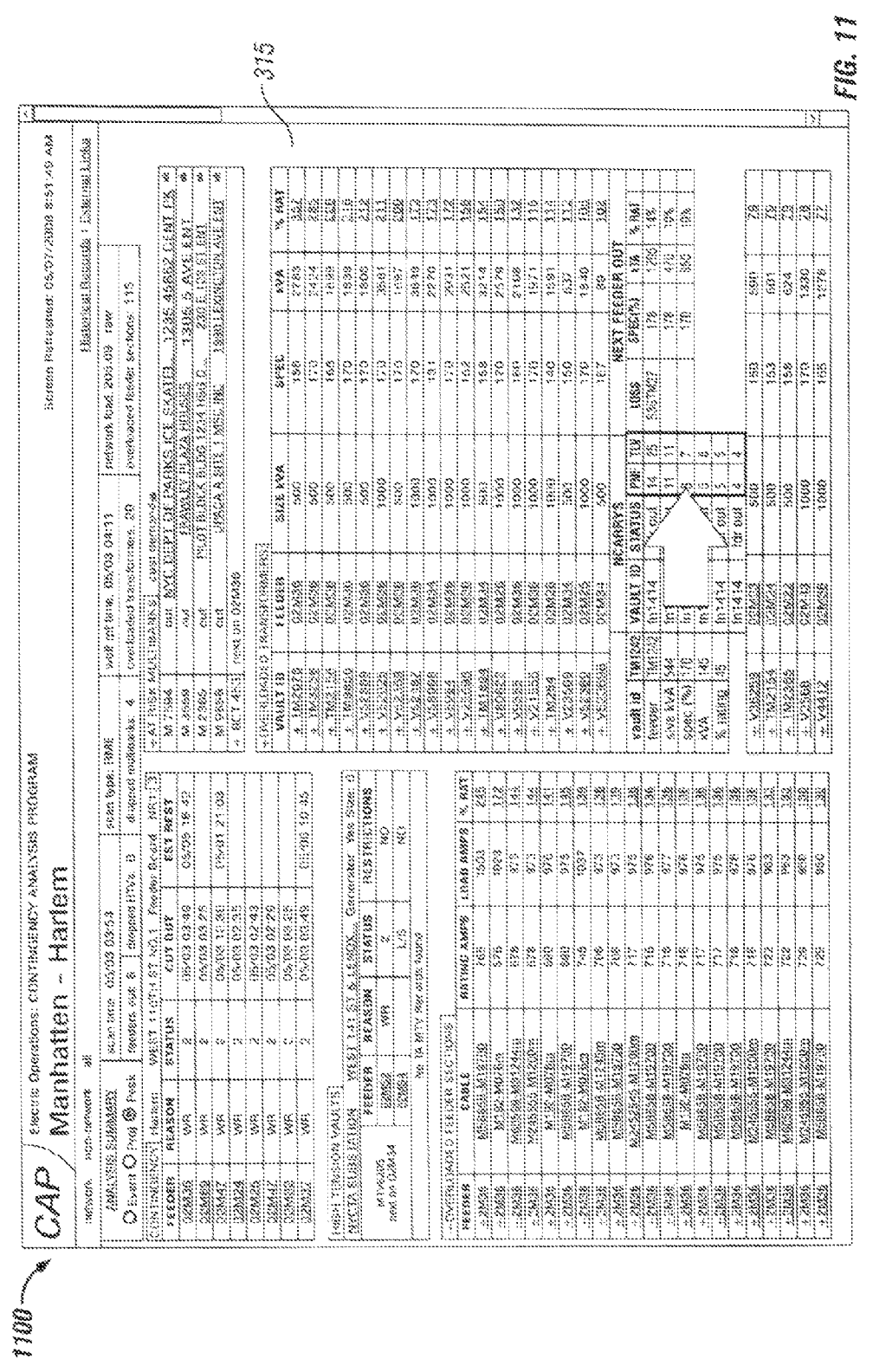

FIG. 11 is screenshot illustrating overloaded utility service component information that can be implemented within embodiments of the present invention.

DETAILED DESCRIPTION

Embodiments of the present invention provides a method and system for performing the method of providing contingency analysis information of a utility service network. Embodiments of the present invention will be discussed in relation to electrical utility service components however the present invention is not limited hereto and may vary as necessary. According to an embodiment of the present invention, a "contingency" is defined as an outage state of utility service components relative to the design of utility service networks. The system according to an embodiment of the present invention, provides the advantages of being able to process distribution electrical feeders from outage to restoration of the feeders, analyze the utility service network or load areas for existing or future contingency cases, identify and prioritize action items to mitigate the existing and future contingency cases, and capture the results of the action items for susceptibility rankings.

Figure 1:
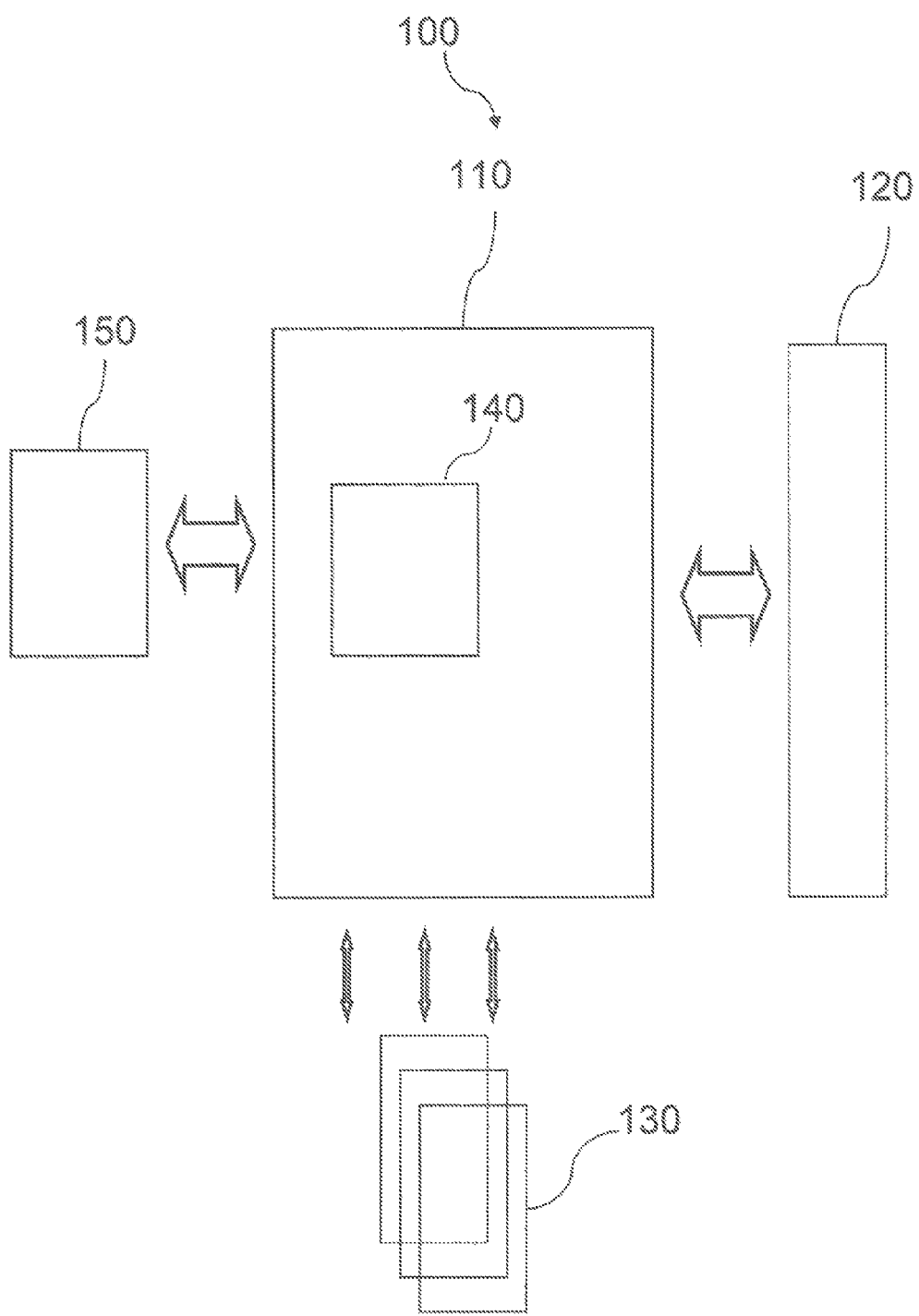
FIG. 1 is a block diagram illustrating a contingency analysis system that can be implemented within embodiments of the present invention.

FIG. 1 is a block diagram illustrating a contingency analysis system that can be implemented within embodiments of the present invention. According to an embodiment of the present invention, a system 100 includes a processing unit 110 and a graphical user interface 120 as shown in FIG. 1. The system 100 may be a general purpose computing device or other suitable computing device for the purpose set forth herein. The graphical user interface 120 is configured to receive and transmit data to and from a user and interface with the processing unit 110. According to an embodiment of the present invention, the processing unit 110 obtains contingency analysis information from a plurality of external sources 130 and stores the obtained information in at least one database 140. According to an embodiment of the present invention, the contingency analysis information comprises at least one of feeder information, current distribution equipment information, isolated network information, overhead system information and utility service outage information. Additional details regarding the contingency analysis information will be discussed below with reference to FIGS. 2 through 11.

Referring back to FIG. 1, the processing unit 110 integrally combines the contingency analysis information obtained from each external source 130 into a single application and prioritizes the contingency analysis information in a predetermined order. According to an embodiment of the present invention, the external sources 130 may include applications such as Quick Wolf which identifies current and projected distribution equipment overloads; Visual Wolf which provides a visual presentation of the load flow report; Net Report which identifies isolated networks and multibank network locations; Net RMS which provides real-time and historical data of distribution transformers; Vault Central which consolidates current status, alarms, and inspection information; SOCCS-X System Operation Computer Control System-Extension which provides real-time data of substation transformers and feeders; Distribution Information System ("DIS") which provides instantaneous feeder load and feeder rating information; and any other necessary applications. The processing unit 110 dynamically updates the contingency analysis information along with the prioritization of the contingency analysis information based on status information. According to an embodiment of the present invention, the status information comprises a current state of the utility service network and current and future event information of the utility service network regarding at least one of feeder losses, feeder faults, current distribution equipment overloads, isolated networks affected, overhead systems affected, and utility service outages. According to an embodiment of the present invention, the user is able to access a single integrated view of the contingency analysis information via a single login at the GUI 120, thereby eliminating the need to log into each external source (i.e., application) 130, individually.

According to an embodiment of the present invention, the processing unit 110 also interfaces with a machine learning model 150 to obtain risk assessment information of the utility service components. Additional details regarding the machine learning model will be discussed below. The contingency analysis information is transmitted via the processing unit 110 to the graphical user interface 120 to be displayed to the user, upon request. The processing unit 110 prioritizes the contingency analysis information in a predetermined order based on a degree of severity of the current and future event information and the processing unit 110 dynamically updates the contingency analysis information and the prioritization of the contingency analysis information in real-time.

Additional details regarding the system 100 and contingency analysis information provided will now be discussed below with reference to FIGS. 2 through 11.

Figure 2:
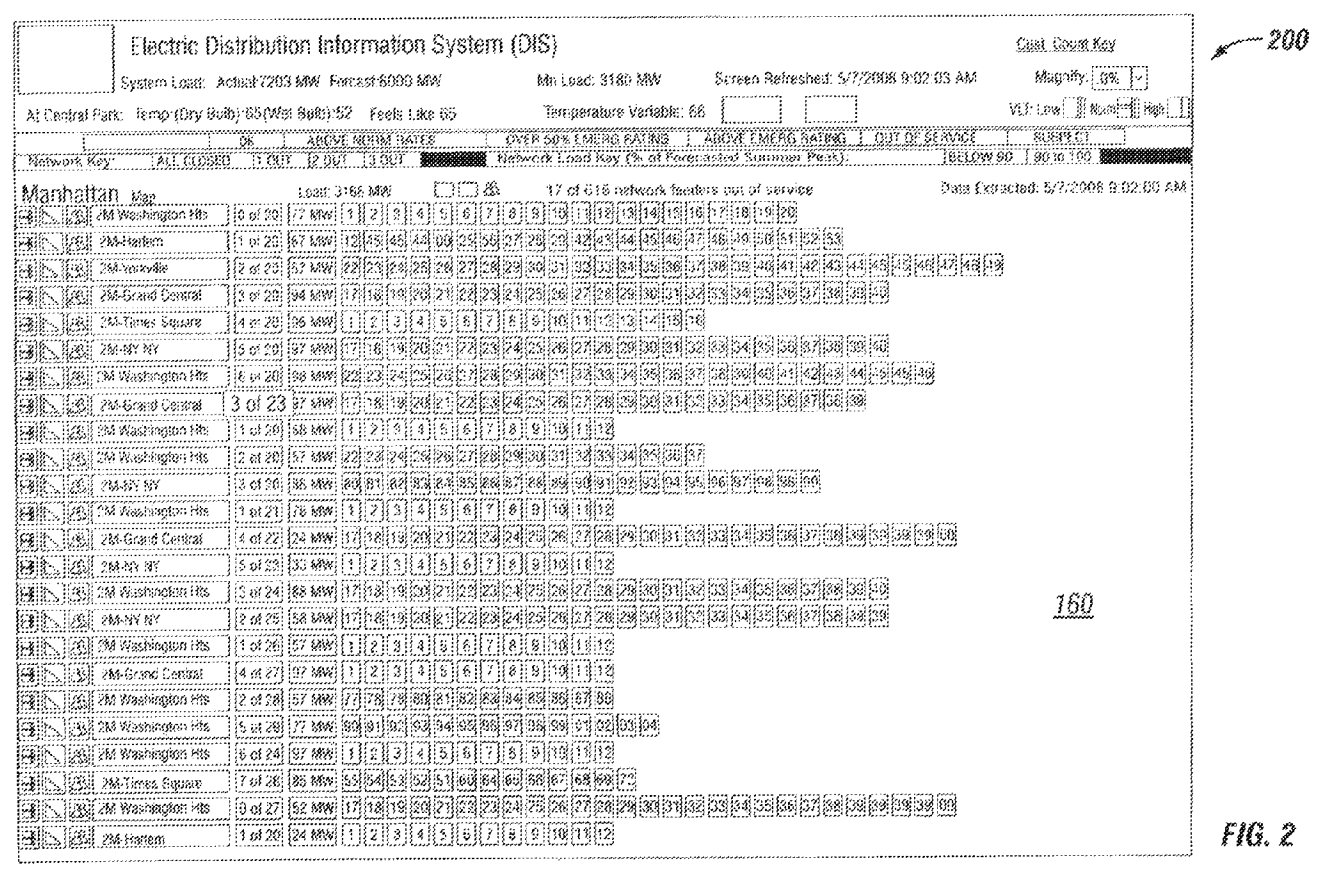
Figure 3:
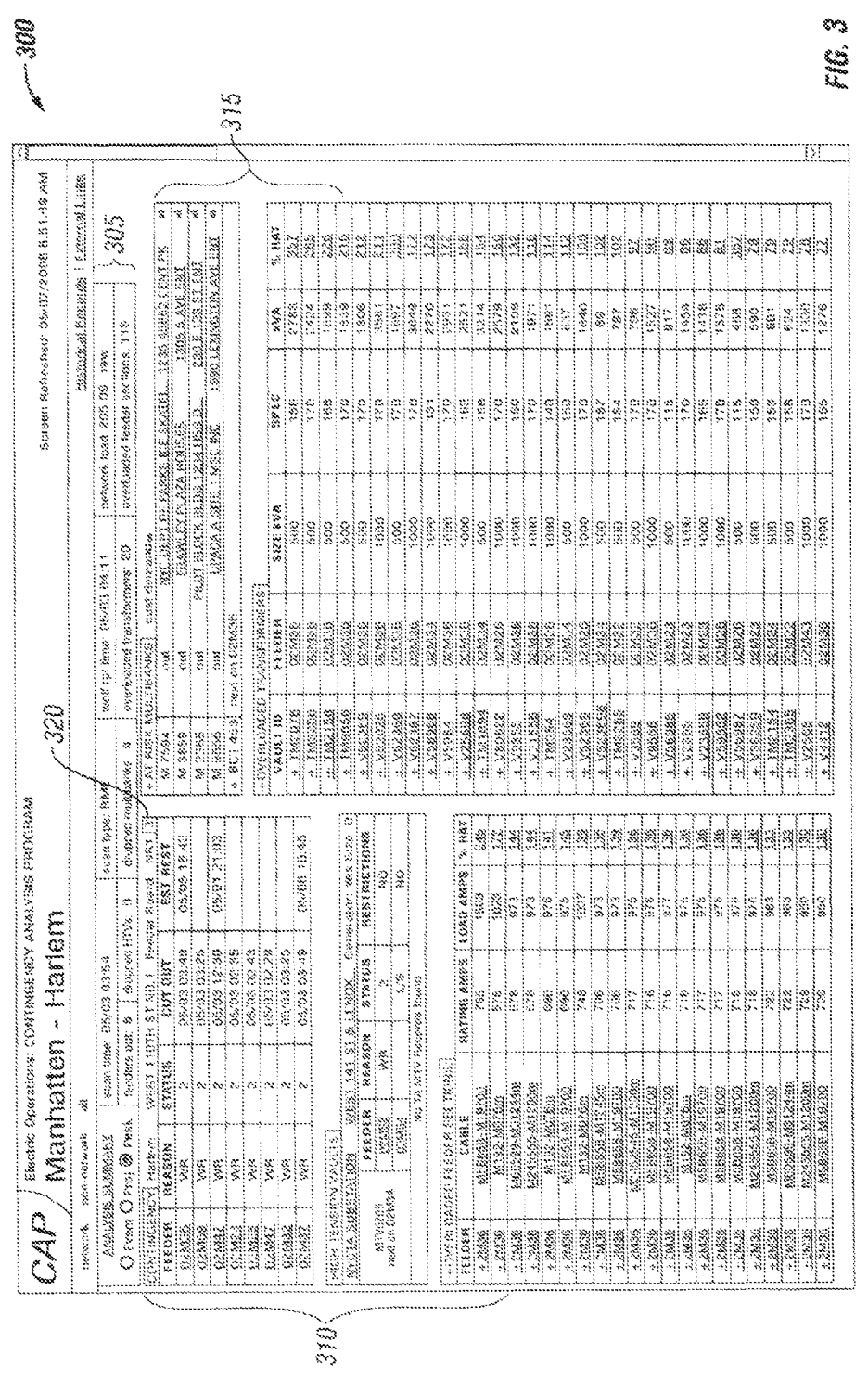

FIG. 2 is a screenshot illustrating a summary of contingency analysis information regarding a utility service network that can be implemented within embodiments of the present invention. As shown in FIG. 2, the screenshot 200 provides contingency analysis information 160 to be viewed by the user via the graphical user interface 120. The contingency analysis information 160 may be illustrated in a plurality of colors based on a degree of severity of each contingency. FIG. 3 is a screenshot illustrating contingency analysis information of a specified utility service network that can be implemented within an embodiment of the present invention. As shown in FIG. 3, the screenshot 300 includes three major sections 305, 310 and 315. According to an embodiment of the present invention, some of the contingency analysis information 160 may be expanded or collapsed. According to an embodiment of the present invention, the first section 305 illustrates a summary of the impact of the contingency on the utility service network. This section 305 includes event, projected or peak information where the user can select event, projected or peak analysis. This section 305 also illustrates the total number of high-tension, isolated and multibank network outages, distribution transformers and feeder sections that are above specified emergency ratings. This section 305 also includes links to historical contingency analysis information reports and the external sources 130 so that the user may access a respective external source 130 of the plurality of external sources 130 via the GUI 120. For example, Red may indicate customer interruptions and/or equipment overloads which have occurred (e.g., a "now" event) while Yellow may indicate next worst contingency with customer interruptions and/or equipment overloads which may occur in the future (e.g., a "next" event).

According to an embodiment of the present invention, the number of contingencies displayed is based on the number of utility service networks that have experienced a contingency in the past or may be affected by a current contingency. Thus, according to one embodiment of the present invention, when a utility service network experiences a contingency it is added to the contingency analysis information displayed. The contingencies are continuously analyzed and registered automatically within the contingency analysis information. The delivery of this information may be event driven with events being defined as current, next, and peak overloads, or overloads occurring at anytime in real-time.

Figure 4:
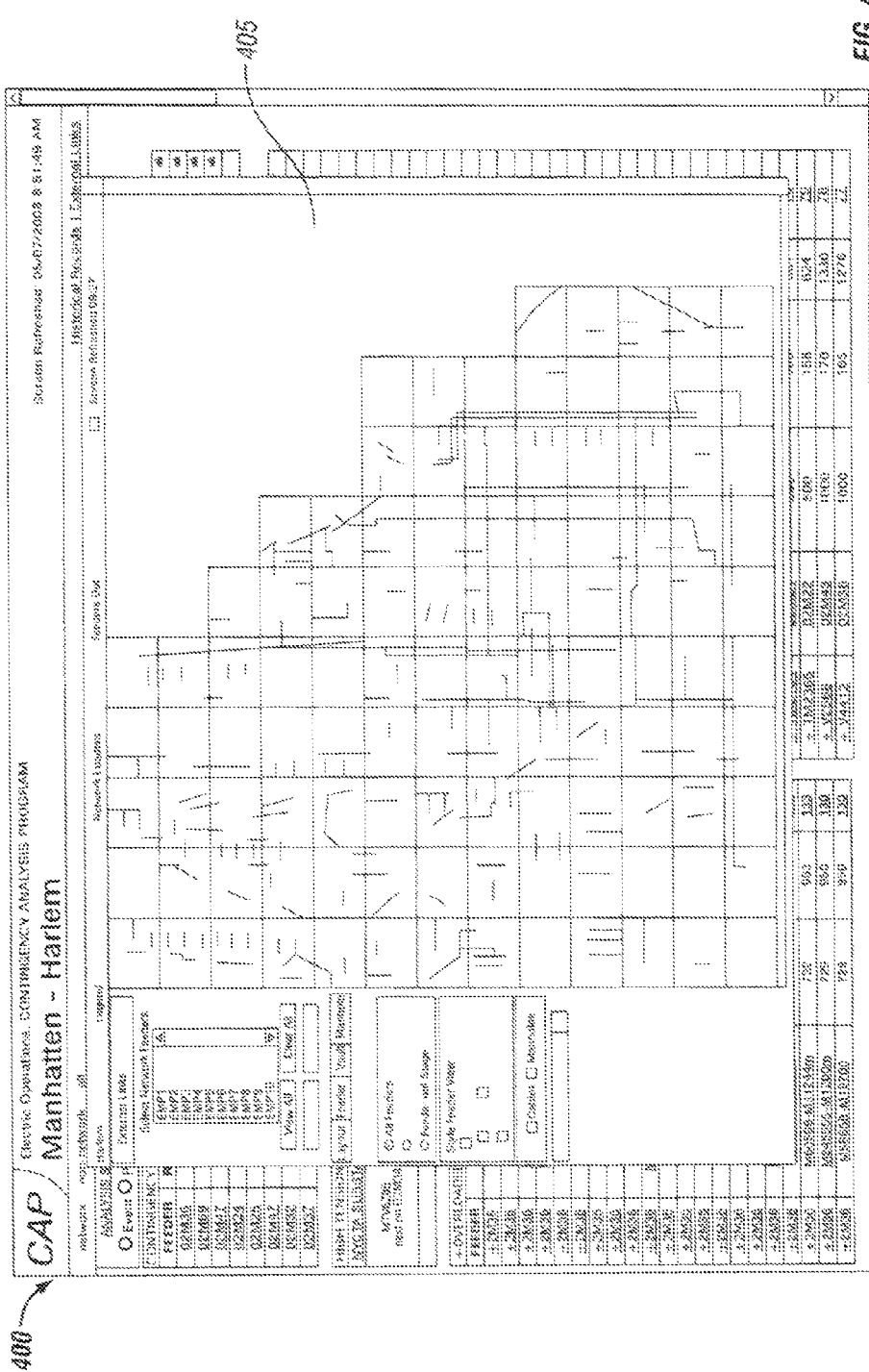
FIG. 4 is a screenshot illustrating a graphical presentation of a feeder circuit selected from the feeder contingency analysis information shown in FIG. 4.

According to an embodiment of the present invention, the second section 310 illustrates the effect of the contingency on feeders of the network including overloaded feeder section information and high tension vaults. For example, this section 310 illustrates feeder outages, data and time information regarding the outage and estimated restoration information of the respective feeder. By selecting a specified feeder via the graphical user interface 120 (as depicted in FIG. 1), the user is able to see a visual representation of the feeder as depicted in FIG. 4. FIG. 4 is a screenshot of a graphical representation of a feeder that can be implemented within embodiments of the present invention. As shown in FIG. 4, a graphical representation 405 illustrating the specified feeder selected is provided to the user via the graphical user interface 120. That is, a graphical representation of sections of the utility service network affected by current and future event information is transmitted from the processing unit 110 to the GUI 120 to be displayed to the user upon request. According to an embodiment of the present invention, the visual representation may be network only, radial only or both. Approximately 80% of the distribution system falls into the "network" category and approximately 20% may fall into the "radial" category. The graphical representation 405 shown in FIG. 4 displays the "network" system.

Referring back to FIG. 3, according to an embodiment of the present invention, section 310 further includes a network reliability indicator (NRI) 320 which is a risk assessment tool that calculates the probability of a cascading network failure. The NRI 320 index value measures the probability of the network being in a state of jeopardy where several contingencies may occur ("now" and "next" events). For example, a probability of 6% to 100% may indicate severe jeopardy, while a probability of 1% to 5% may indicate a warning of possible jeopardy, and a probability of 0% to 1% may indicate that a cascading network failure is unlikely. The probability may also be distinguishable by a color such as red, yellow or green. The risk assessment tool is a machine learning model 150 (as depicted in FIG. 1) which incorporates machine learning and pattern recognition algorithms to assist in analysis of the data such as that described in co-pending, commonly assigned U.S. patent application Ser. No. 12/178,553 entitled System and Method for Grading Electricity Distribution Network Feeders Susceptible to Impending Failure filed on Jul. 23, 2008 by Arthur Kressner, Mark Mastrocinque, Matthew Koenig and John Johnson which is incorporated by reference in its entirety. The processing unit 110 of the system 100 is configured to obtain the risk assessment information from the machine learning module 150 and determine the future event information based on the current event information and the associated risk assessment information obtained.

Referring back to FIG. 3, detailed high tension vault information is also provided to the user via the GUI 120. This information includes hospitals and other high tension electrical service locations. The information is shown in section 310 and may be expanded or collapsed globally or individually. This information illustrates the high tension vault locations, feeders, reason for the contingency, current status and any restrictions associated with outage scheduling. It also includes generator information is applicable to a respective high tension vault location. Color codes may be used to indicate a degree of severity at each high tension vault location. Further, overloaded feeder section information may be provided to the user and may be sorted in a descending order based on load. This information may also be color coded such that Red for example, indicates a "now" event and Yellow indicates a "next event" to occur.

Figure 5:
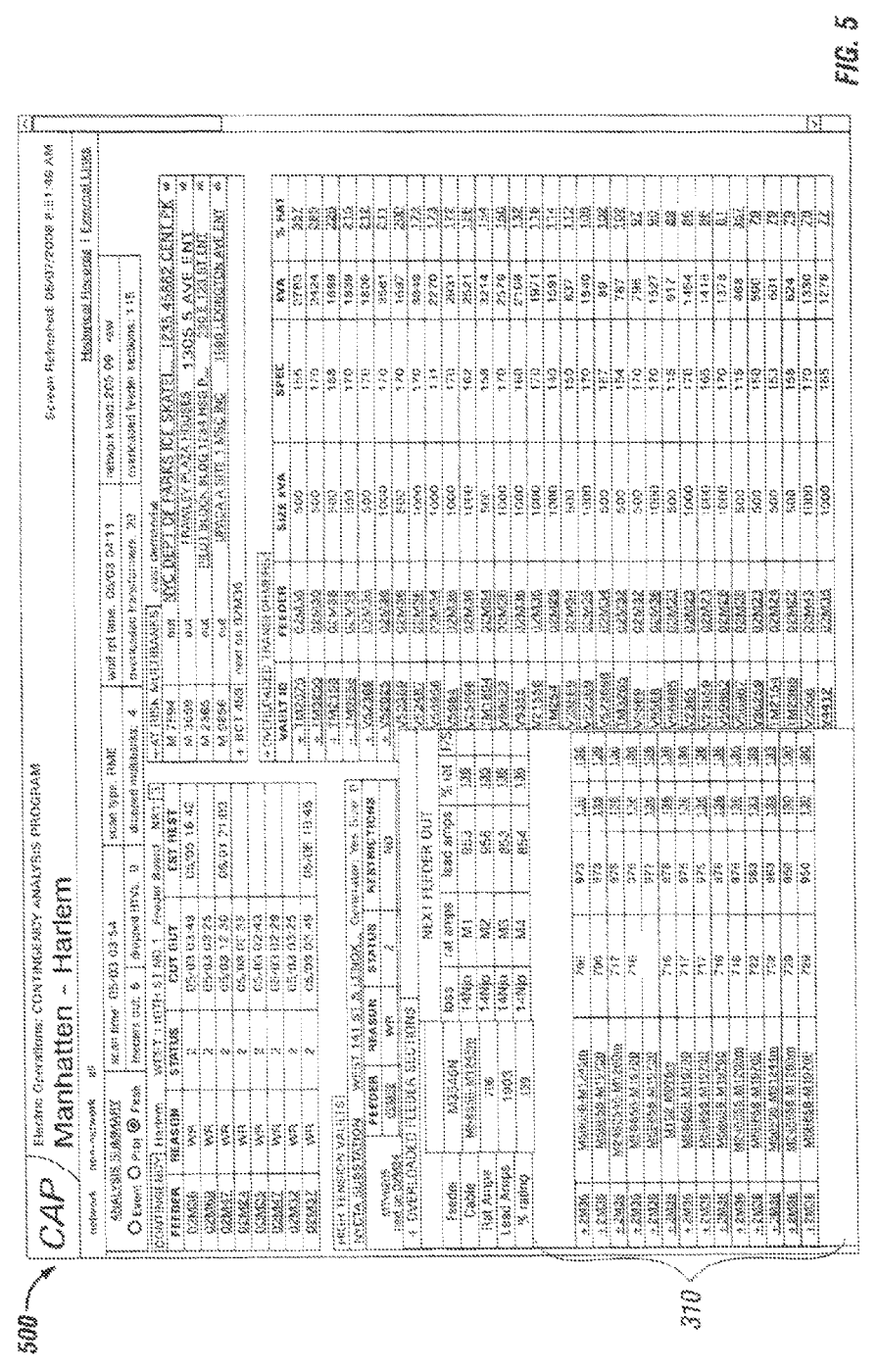
Figure 6:
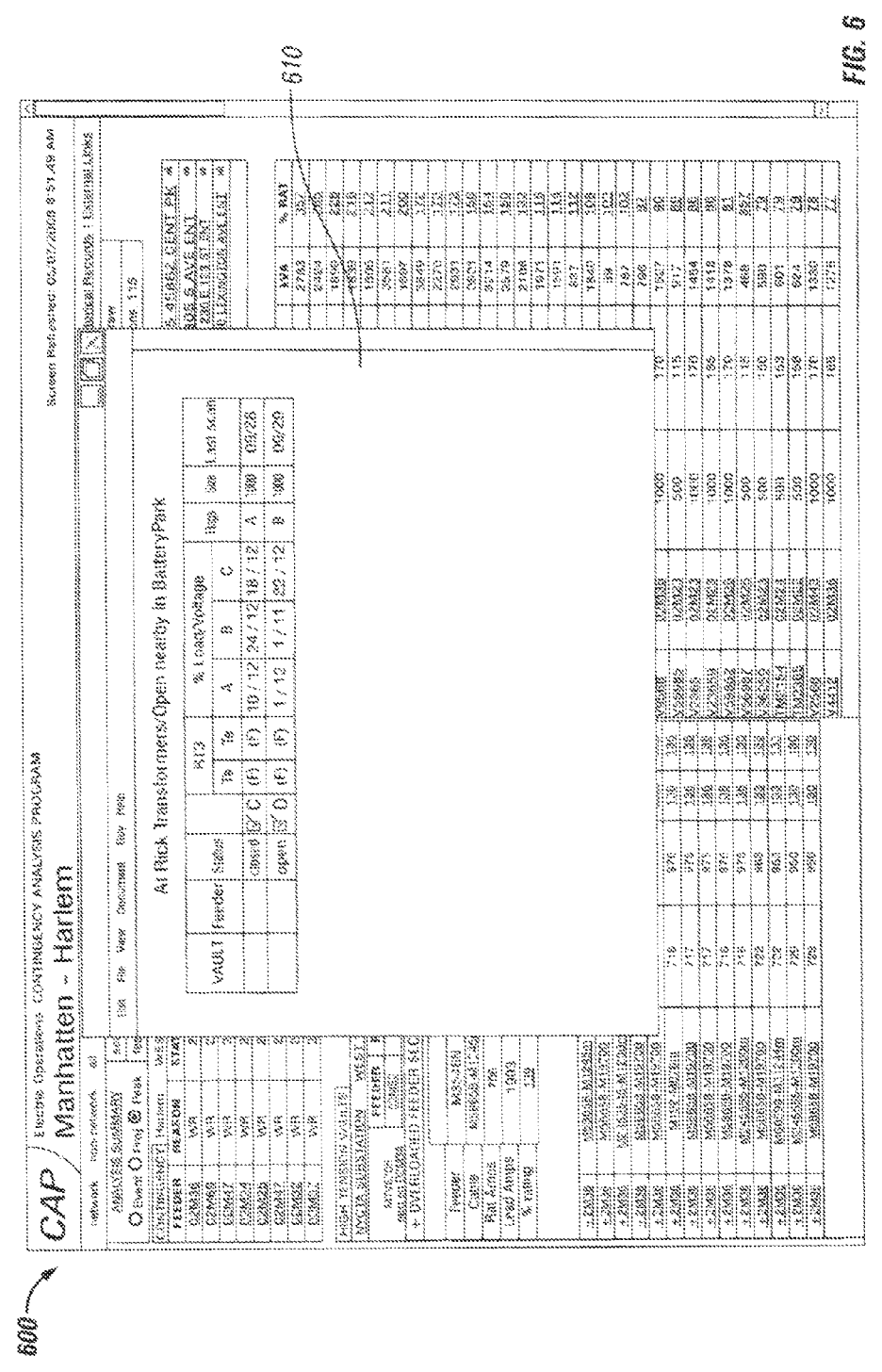

FIG. 5 is a screenshot illustrating additional detailed information regarding overloaded feeders that can be implemented within embodiments of the present invention. As shown in FIG. 5, the screenshot 500 illustrates information including feeder number, section of concern from structure to structure, emergency rating of the feeder section in amps, the current load on the section in amps and as a percentage rating and a "next" worst event information under "next feeder out" in a descending order of severity. This information also includes feeder susceptibility (FS) information ranked using the machine learning model 150 (as depicted in FIG. 1) which interfaces with the system 100. The FS information may be color coded to indicate severity. The selection of a specified feeder number in this section by a user via the GUI 120, opens another window 610 shown in screenshot 600 (as shown in FIG. 6) which illustrates a "Trouble Nearby" Report for the target feeder. This report lists any nearby utility service components (e.g., transformers) that are in an abnormal state and may be contributing to the feeder section overload "now" or "next" event. From this point, the user may also access a visual representation of the target feeder as shown in FIG. 4.

Referring back to FIG. 3, the third section 315 of the screenshot 300 illustrates the effect of the contingency on isolated and multibank networks and distribution transformers. As shown, this information includes vault number, location name and address information, for example and may be color-coded based on severity. The selection of any of this information by the user allows the user to access a plurality of displays as shown in FIGS. 7 through 10 discussed below.

FIGS. 7 through 10 illustrates screenshots showing a plurality of displays accessible by a user via the graphical user interface shown in FIG. 1 that can be implemented within embodiments of the present invention. For example, the selection of a specified vault number by the user via the GUI 120 displays a list 710 of nearby utility service component information (e.g., transformers) as shown in screenshot 700 in FIG. 7. The selection of the location name in section 315 by the user displays an account overview 810 for the location as shown in screenshot 800 in FIG. 8. According to an embodiment of the present invention, the selection of the address in section 315 displays a visual representation 910 of the location as shown in screenshot 900 in FIG. 9. Further, the selection of the customer demand link in section 315 displays a load aggregator 1010 for the location as shown in screenshot 1000 of FIG. 10.

Referring back to FIG. 3, section 315 further includes information regarding overloaded transformers in a descending order based on overload severity. This information includes vault number, feeder number, the size of the transformer in kVA, the contingency rating as a percentage, calculated load on the transformer in kVA and the current calculated load on the transformer as a percentage of its contingency rating, for example. This information is also expandable to show nearby utility service component information and next feeder out information including FS information (as discussed with reference to FIG. 5), as shown in screenshot 1100 shown in FIG. 11 when selected by the user.

Embodiments of the present invention provide a method and system for providing contingency analysis information of a utility service network in a single integrated way. Therefore, the present invention provides the advantages of contingency event recognition and confirmation, current system impact, initial mitigating actions (i.e., which events to address first based on severity) and identification of the next worst contingency.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), or erasable programmable read only memory (EPROM), for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to provide contingency analysis information for a utility service network in an automated and integrated way.

What is claimed is:

1. A computer-implemented method of providing real-time contingency analysis information for a utility service network, the method comprising:
    obtaining real-time contingency analysis information from a plurality of existing external sources;
    integrally combining the real-time contingency analysis information obtained from each of the plurality of external sources into a single application and prioritizing the real-time contingency analysis information in a predetermined order;
    dynamically updating, the real-time contingency analysis information obtained from each of the plurality of external sources and the prioritization of the real-time contingency analysis information based on status information; and
    displaying the real-time contingency analysis information to a user via a graphical user interface.

2. The computer-implemented method of claim 1, wherein the real-time contingency analysis information comprises at least one of feeder information, current distribution equipment information, isolated network information, overhead system information and utility service outage information.

3. The computer-implemented method of claim 2, wherein the status information comprises a current state of the utility service network and current event information and future event information of the utility service network regarding at least one of feeder losses, feeder faults, current distribution equipment overloads, isolated networks affected, overhead systems affected, and utility service outages.

4. The computer-implemented method of claim 3, wherein the method further comprises:
    obtaining risk assessment information; and
    determining the future event information based on the current event information and associated risk assessment information obtained.

5. The computer-implemented method of claim 4, wherein prioritizing the real-time contingency analysis information in a predetermined order is based on a degree of severity of the current and future event information.

6. The computer-implemented method of claim 5, wherein dynamically updating the real-time contingency analysis information and the prioritization of the real-time contingency analysis information is performed in real-time.

7. The computer-implemented method of claim 6, wherein the method further comprises:
    providing graphical representation of sections of the utility service network affected by the current and future event information to the user via the graphical user interface upon request.

8. The computer-implemented method of claim 6, the method further comprises:
    accessing a respective external source of the plurality of external sources via the graphical user interface upon request of the user.

9. The computer-implemented method of claim 7, wherein the real-time contingency analysis information comprises feeder susceptibility information.

10. The computer-implemented method of claim 9, the prioritizing comprising prioritizing the feeder susceptibility information based on a machine learning model.

11. The computer-implemented method of claim 7, the displaying comprising:
    displaying a first section including the current and future event information via the graphical user interface;
    displaying a second section including overloaded feeder section information and high tension vault information via the graphical user interface; and
    displaying a third section including vault number information, vault location name information, and vault address information via the graphical user interface.

12. The computer-implemented method of claim 7, the displaying further comprising displaying the real-time contingency analysis information using a plurality of colors based on the degree of severity of the current and future event information.

13. A non-transitory computer readable storage medium storing program instructions executable by a computer to perform a method of providing real-time contingency analysis information for a utility service network, the method comprising:
    obtaining real-time contingency analysis information from a plurality of existing external sources;
    integrally combining the real-time contingency analysis information obtained from each of the plurality of external sources into a single application and prioritizing the real-time contingency analysis information in a predetermined order;
    dynamically updating, the real-time contingency analysis information obtained from each of the plurality of external sources and the prioritization of the real-time contingency analysis information based on status information; and
    displaying the real-time contingency analysis information to a user via a graphical user interface.

14. The non-transitory computer readable storage medium of claim 13, wherein the real-time contingency analysis information comprises at least one of feeder information, current distribution equipment information, isolated network information, overhead system information and utility service outage information.

15. The non-transitory computer readable storage medium of claim 14, wherein the status information comprises a current state of the utility service network and current event information and future event information of the utility service network regarding at least one of feeder losses, feeder faults, current distribution equipment overloads, isolated networks affected, overhead systems affected, and utility service outages.

16. The non-transitory computer readable storage medium of claim 15, wherein the method further comprises:
obtaining risk assessment information; and
determining the future event information based on the current event information and associated risk assessment information obtained.

17. The non-transitory computer readable storage medium of claim 16, wherein prioritizing the real-time contingency analysis info nation in a predetermined order is based on a degree of severity of the current and future event information.

18. The non-transitory computer readable storage medium of claim 17, wherein dynamically updating the real-time contingency analysis information and the prioritization of the real-time contingency analysis information is performed in real-time.

19. The non-transitory computer readable storage medium of claim 18, wherein the method further comprises:
providing graphical representation of sections of the utility service network affected by the current and future event information to the user via the graphical user interface upon request.

20. The non-transitory computer readable storage medium of claim 19, wherein the method further comprises:
accessing a respective external source of the plurality of external sources via the graphical user interface upon request of the user.

21. The non-transitory computer readable storage medium of claim 20, wherein the real-time contingency analysis information comprises feeder susceptibility information.

22. The non-transitory computer readable storage medium of claim 21, the prioritizing comprising prioritizing the feeder susceptibility information based on a machine learning model.

23. The non-transitory computer readable storage medium of claim 20, the displaying comprising:
displaying a first section including the current and future event information via the graphical user interface;
displaying a second section including overloaded feeder section information and high tension vault information via the graphical user interface; and
displaying a third section including vault number information, vault location name information, and vault address information via the graphical user interface.

24. The non-transitory computer readable storage medium of claim 20, the displaying further comprising displaying the real-time contingency analysis information using a plurality of colors based on the degree of severity of the current and future event information.

25. A system comprising:
a graphical user interface configured to receive and transmit data to and from a user and interfacing with a processing unit configured to:
obtain real-time contingency analysis information from a plurality of existing external sources;
integrally combine the real-time contingency analysis information obtained from each of the plurality of external sources into a single application and prioritize the real-time contingency analysis information in a predetermined order;
dynamically update, the real-time contingency analysis information obtained from each of the plurality of external sources and the prioritization of the real-time contingency analysis information based on status information; and
transmit the real-time contingency analysis information to the graphical user interface to be displayed to the user upon request.

26. The system of claim 25, wherein the real-time contingency analysis information comprises at least one of feeder information, current distribution equipment information, isolated network information, overhead system information and utility service outage information.

27. The system of claim 26, wherein the status information comprises a current state of a utility service network and current event information and future event information of the utility service network regarding at least one of feeder losses, feeder faults, current distribution equipment overloads, isolated networks affected, overhead systems affected, and utility service outages.

28. The system of claim 27, wherein the processing unit is further configured to:
obtain risk assessment information; and
determine the future event information based on the current event information and associated risk assessment information obtained.

29. The system of claim 28, wherein prioritizing the real-time contingency analysis information in a predetermined order is based on a degree of severity of the current and future event information.

30. The system of claim 29, wherein dynamically updating the real-time contingency analysis information and the prioritization of the real-time contingency analysis information is performed in real-time.

31. The system of claim 30, wherein the processing unit is configured to:
provide graphical representation of sections of the utility service network affected by the current and future event information to the graphical user interface to be displayed to the user upon request.

32. The system of claim 31, wherein the processing unit is further configured to:
access a respective external source of the plurality of external sources upon request of the user via the graphical user interface.

33. The system of claim 32, wherein the real-time contingency analysis information comprises feeder susceptibility information.

34. The system of claim 33, wherein the processing using is configured to prioritize the feeder susceptibility information based on a machine learning model.

35. The system of claim 32, wherein the processing using is configured to:
display a first section including the current and future event information via the graphical user interface;
display a second section including overloaded feeder section information and high tension vault information via the graphical user interface; and display a third section including vault number information, vault location name information, and vault address information via the graphical user interface.

36. The system of claim 32, wherein the processing using is configured to display the real-time contingency analysis information using a plurality of colors based on the degree of severity of the current and future event information.

* * * * *